United States Patent [19]
Myers et al.

[11] 3,956,573
[45] May 11, 1976

[54] FLUSH TYPE FLOOR BOX

[75] Inventors: John L. Myers; David L. Singleton, both of Parkersburg, W. Va.

[73] Assignee: Textron, Inc., Providence, R.I.

[22] Filed: May 22, 1975

[21] Appl. No.: 579,944

Related U.S. Application Data

[63] Continuation-in-part of Ser. No. 465,152, April 29, 1974.

[52] U.S. Cl. ................................ 174/48; 174/57; 174/67; 339/36
[51] Int. Cl.$^2$ .......................................... H02G 3/12
[58] Field of Search .................. 339/36, 44, 40, 41, 339/42; 174/48, 49, 57, 67; 220/3.7, 242

[56] References Cited
UNITED STATES PATENTS

| | | | |
|---|---|---|---|
| 1,305,610 | 6/1919 | Krantz | 220/3.7 |
| 2,033,602 | 3/1936 | Adam | 174/57 |
| 2,559,151 | 7/1951 | Getzoff | 220/242 X |
| 2,886,630 | 5/1959 | Gill | 174/57 |
| 2,936,092 | 5/1960 | Johnson | 220/3.7 |
| 2,996,566 | 8/1961 | Stas | 174/48 X |
| 3,027,416 | 3/1962 | Kissel | 174/57 |
| 3,064,850 | 11/1962 | Kelly | 220/3.7 |
| 3,187,922 | 6/1965 | Hoskins et al. | 220/3.7 X |

*Primary Examiner*—J. V. Truhe
*Assistant Examiner*—David A. Tone
*Attorney, Agent, or Firm*—Frederick J. Olsson

[57] ABSTRACT

Flush type floor box including a flat floor plate assembly having a pair of caps which cover a duplex receptacle. For access to the receptacle the caps are pried up and swung away by using a tool such as the tip of a screwdriver. The floor plate can be adjusted vertically and tilted in a vertical position so as to be level or flush with the floor surface either at the time of the pour or after the concrete has hardened.

20 Claims, 17 Drawing Figures

_Fig. 16_

_Fig. 17_

FLUSH TYPE FLOOR BOX

This application is a continuation-in-part of co-pending application Ser. No. 465,152 filed Apr. 29, 1974.

This invention relates in general to electrical underfloor distribution systems and in particular relates to a floor box for such systems to provide an electrical power outlet flush or level with the floor surface.

One of the objects of the invention is to provide a flush type floor box wherein access to the receptacle is provided by a pair of caps which can be quickly pried upwardly out of retaining sockets and swung away to clear the receptacle.

Another object of the invention is to provide a floor plate assembly including a receptacle covered by one or more displacable caps, the assembly being adapted without modification to a wide variety of boxes to provide for vertical adjustment and/or both vertical and tilting adjustment for purposes of making the floor plate flush or level with the surface of the floor.

With respect to the vertical adjustment and tilting, the most important advantage is that it provides for after-adjust. The top of the box to be made level with the surface of the floor at the time of the pour and if such adjustment is subsequently disturbed (for example, by the box being accidentally jolted by construction equipment) the top can be leveled even though the concrete has hardened.

As to the floor plate assembly, it has several advantages and these are numerated below but not necessarily in order of importance.

a. The caps are fixed to the assembly and therefore are not susceptible to loss.
b. A cap can be moved to expose the receptacle simply by using the tip of a screwdriver or the blunt end of a nail file which pries the cap upwardly and at the same time rotates the cap in the proper direction.
c. The assembly, including the caps, lies flush with the floor when the receptacle is not being used and when the caps are swung away to provide access, the caps extend above the floor only in an amount equal to their thickness which is about 5/32 inch.
d. One or both sections of a duplex receptacle can be used and when only one section is being used the other section may remain covered.
e. The caps are held down against a gasket in a water resistant position by an internal spring and this eliminates the need for locking or holddown screws.
f. The assembly is readily adaptable for use with a single high amperage receptacle or with a conventional duplex receptacle.
g. The assembly is readily adaptable in a rectangular configuration which allows a gang of receptacles to be set up side by side.

Other objects and various advantages of the invention will be apparent from the following description taken in conjunction with the drawings wherein.

The floor plate assembly 1 will be described in connection with FIGS. 1 through 5.

Figures 3, 4:
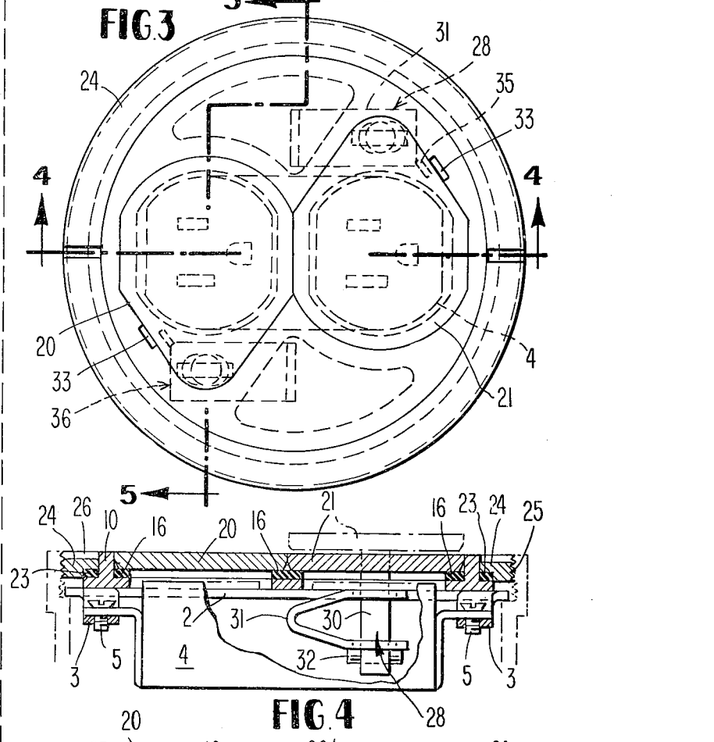
FIG. 3 is a plan view of the assembly of FIG. 1.
FIG. 4 is an elevational view taken along the lines 4—4 of FIG. 3, portions of the duplex receptacle being omitted for purposes of clarity.
Figure 5:
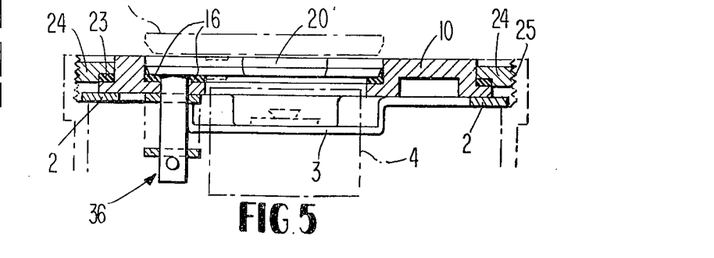
FIG. 5 is a view taken along the lines 5—5 of FIG. 3 with the receptacle shown in phantom.

A receptacle ring 2 has a pair of recessed sections 3 for mounting the tabs of a duplex receptacle 4 (FIG. 4). The tabs are held in place by the screws 5. The underside of the ring 2 has serrations or teeth 6 used in maintaining the ring in position as will be explained later.

A floor plate 10 engages the top side of the receptacle ring 2. The floor plate has a top surface 11. When the box is installed the top surface is positioned flush or level with the surface of the floor. The plate has a pair of openings respectively comprising the lower sections 12 and 13 and the enlarged upper sections 14 and 15. The lower sections receive the outlet portions of the receptacle as best noted in FIGS. 1 and 3.

Figure 2:
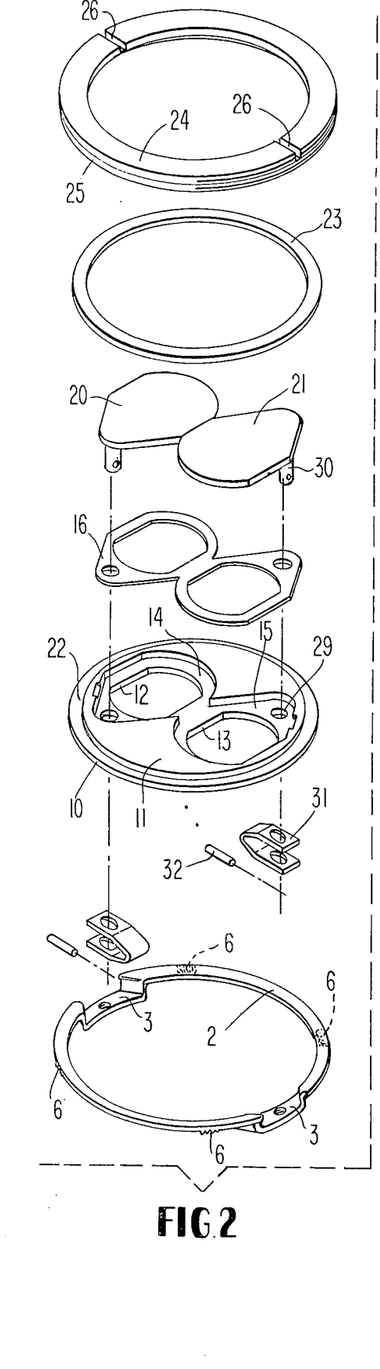
FIG. 2 is an exploded view of the assembly of FIG. 1.

The upper sections 14 and 15 form a pair of sockets to receive the cap gasket 16 and the swing caps 20 and 21. A shoulder 22 formed on the periphery of the plate 10 receives the ring gasket 23 and the locking ring 24. The ring has external threads 25 which are adapted to mate with threads on the adjusting ring (as will be explained later) for holding the assembly in place on the box. The lock ring 24 has slots 26 which accept a tool to tighten or loosen the ring.

Figure 1:
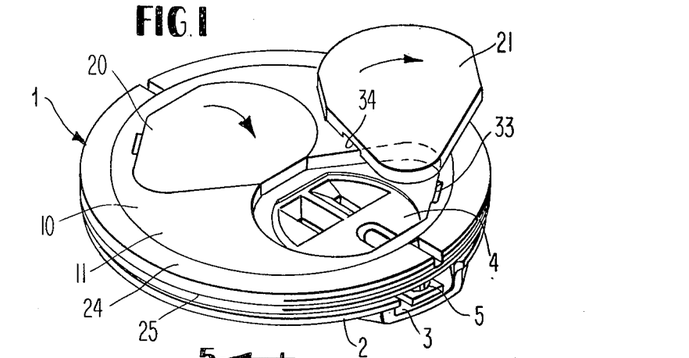
FIG. 1 is a perspective view of a floor plate assembly.

Each swing cap is joined to the floor plate by a connector which provides for the cap to move vertically out of its socket and positioned as shown for the cap 21 in FIG. 1.

For the cap 21 the connector 28 includes the aperture 29 in the floor plate, a pin 30 fixed to the bottom to the cap and extending into the aperture 29 and outwardly from the plate as best noted in FIG. 4. A V-shaped leaf spring 31 is mounted on the pin 30. The top leg of the spring engages the underside of the plate and the bottom leg engages the stop pin 32. The spring functions to pull the cap down tightly against the gasket 16 yet permit the cap to be raised and swung away. The engagement between the cap and gasket is water resistant.

For raising and starting rotation of the cap the plate is slotted at 33 and the cap slotted at 34. The mating slots provide space for insertion of the tip of a screwdriver. When the screwdriver pries the cap out of the socket it also moves the cap clockwise and causes the cap to rest on the top surface 11 to start rotation. After the cap is free from the socket, it can be rotated away by hand. The rotational position of the cap 21 is determined by a stop 35 (FIG. 3) on the underside of the cap which engages the wall of the socket when the cap is rotated to the position of FIG. 1.

The cap 20 has a connector 36 which is identical in structure and function to the connector 28.

In FIGS. 6,7,8, and 9 we have illustrated how the above described floor plate assembly is adapted to a floor box wherein the assembly can be adjusted in a vertical direction for leveling purposes.

Figure 6:
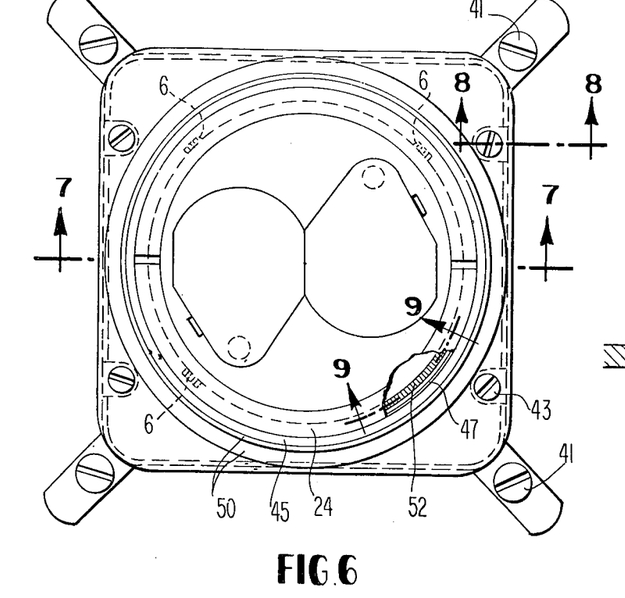
FIG. 6 is a plan view of a floor box constructed in accordance with the invention which provides for the floor plate assembly to be adjusted in the vertical direction.
Figure 7:
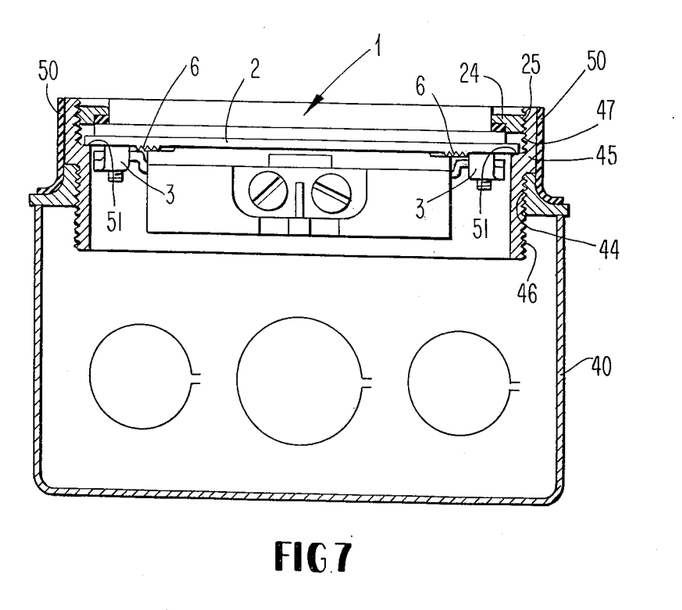
FIG. 7 is an elevational view taken along the lines 7—7 of FIG. 6.
Figure 8:
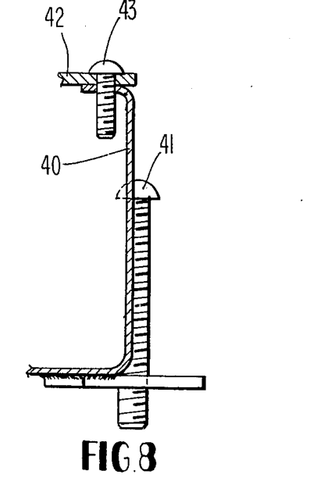
FIG. 8 is a view taken along the lines 8—8 of FIG. 6.

The box 40 has vertical adjusting lugs 41 and on the top of the box is an adjusting plate 42 secured to the box as by the screws 43. The plate 42 is internally threaded at 44.

An adjusting ring 45 has external threads 46 mating with the threads 44. On the top of the adjusting ring 45 are internal threads 47 mating with the threads 25 of the lock ring 24.

The threads 44 and 46 provide for the adjusting ring 45 and floor plate assembly 1 to be moved in a vertical direction. In some instances a set screw is provided in the adjusting ring 45 to engage the adjusting plate 42 and lock the ring in position. In the usual case, the vertical adjustment is accomplished with the floor plate assembly removed.

A flexible, protective gasket 50 surrounds and grips the ring 45 and extends down on the plate 42 over the top of the box 40. The gasket shields the threads 46 from the concrete during adjustment with a wet pour.

Figure 9:
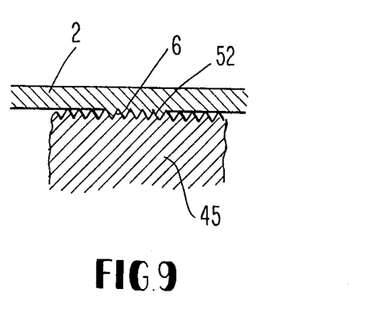
FIG. 9 is a view taken along the lines 9—9 of FIG. 6.

The adjusting ring 45 has a shoulder 51 which is provided with serrations to teeth 52. The teeth 6 on the underside of the receptacle plate engage the teeth 52 (FIG. 9). This insures that the receptacle will remain oriented in the desired direction when the lock ring 24 is tightened down.

Parenthetically, it is to be observed that the recessed sections 3 on the receptacle ring 2 are offset inwardly (FIG. 7) so as not to interfere with the mating of the teeth 6 and 52.

Figure 10:
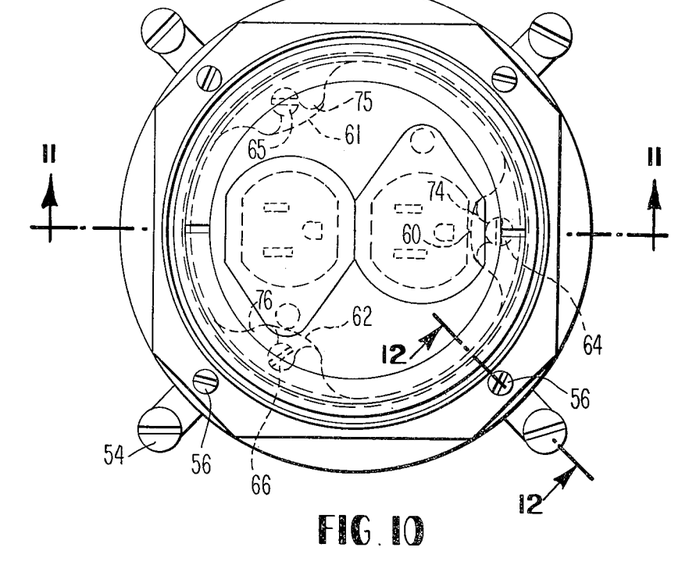
FIG. 10 is a plan view of another embodiment of a floor box constructed in accordance with the invention which provides for the floor plate assembly to be adjusted vertically and/or to be tilted.
Figures 11, 12:
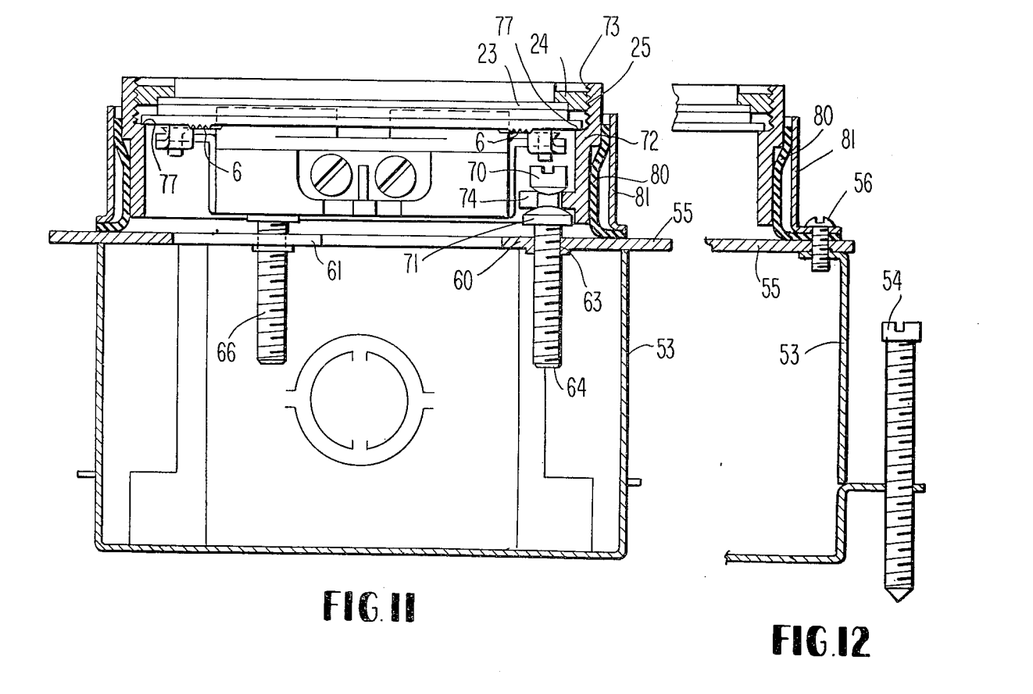
FIG. 11 is an elevational view taken along the lines 11—11 of FIG. 10.
FIG. 12 is a view taken along the lines 12—12 of FIG. 10.

In FIGS. 10, 11, and 12 we have shown how the assembly 1 is employed with the floor box wherein the assembly can be adjusted in a vertical direction and then titled to conform with the floor level (or tilted without some specific vertical position).

The box 53 has vertical adjusting lugs 54. At the top of the box there is an adjusting plate 55 which is secured in position by the screws 56.

The adjusting plate 55 has three inwardly projecting shoulders 60, 61, and 62 which are spaced 120° apart. Each shoulder has a threaded aperture such as the aperture 63 for the shoulder 60.

The threaded adjusting screws 64, 65, 66 operate in respective apertures. Each screw has spaced head and shoulders such as the head 70 and shoulder 71 for the screw 64. As noted, the bottom of the head 70 and top of the shoulder 71 are contoured.

An adjusting ring 72 has top internal threads 73 which mate with the threads 25 and the lock ring 24. On the bottom the ring 72 has inwardly projecting slotted shoulders 74, 75, 76 which are captured in the space between the head and shoulders of the adjusting screws as is indicated in FIG. 11.

The adjusting ring has a shoulder 77 provided with serrations (not shown) which mate with the teeth 6 on the receptacle plate and maintain the floor plate assembly in position.

A flexible protective gasket 80 engages the outside surface of the adjusting ring 72 and extends on the plate 55 over the top of the box 53. A protective ring 81 surrounds the gasket. The ring and gasket are held down by the screws 56.

The adjusting screws 64,65, 66 provide for the adjusting ring to move in a vertical direction and for the ring to be tilted in the desired vertical position.

The contact between the head and shoulder of an adjusting screw and the captured shoulder of the adjusting ring is such that there is a snug but sliding fit. This operates to permit tilting yet to keep the adjusting ring in position. The vertical and/or tilting adjustments are accomplished with the floor plate assembly removed.

Figure 13:
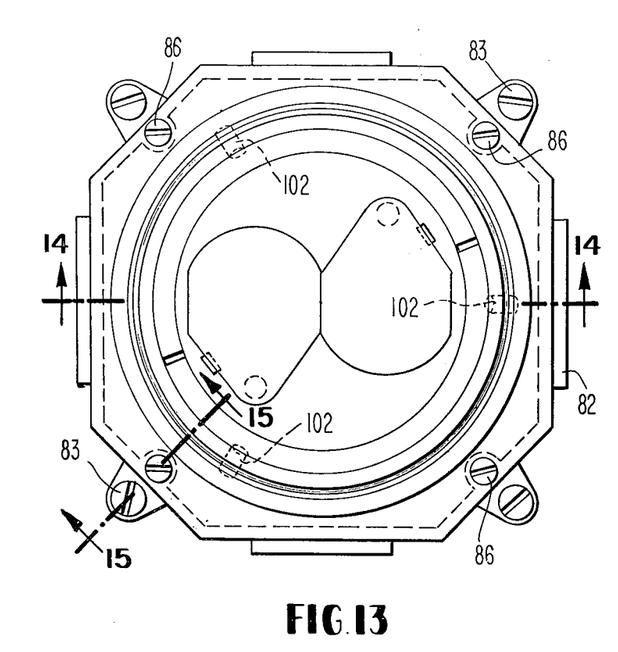
FIG. 13 is a plan view of another embodiment of a floor box constructed according to the invention providing for the floor plate assembly to be adjusted vertically and/or be tilted.
Figure 14:
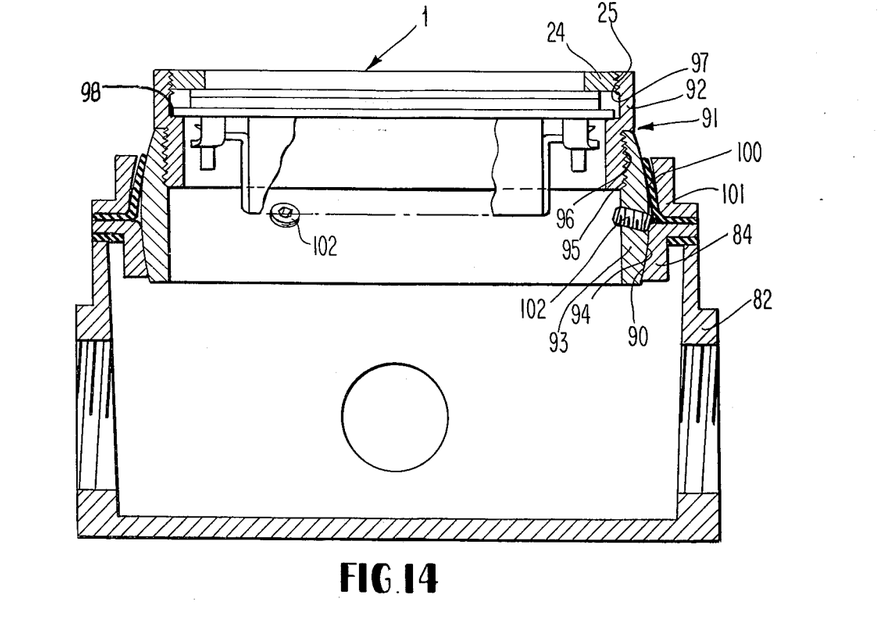
FIG. 14 is an elevational view taken along the lines 14—14 of FIG. 13.
Figure 15:
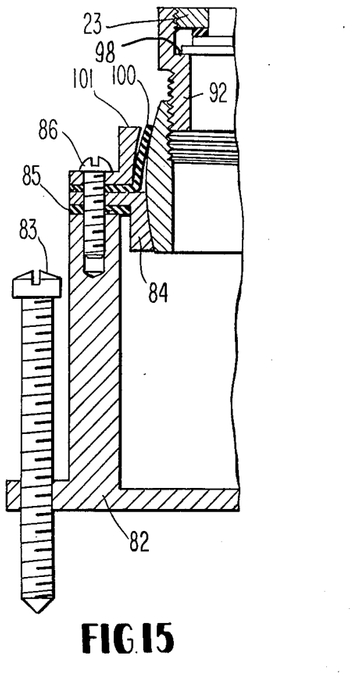
FIG. 15 is a fragmentary view taken along the lines 15—15 of FIG. 13.

In FIGS. 13, 14, 15 we have shown the assembly 1 employed with another embodiment of a floor box which provides for vertical and tilting adjustment.

The cast box 82 has vertical adjusting lugs 83 and the top of the box has an adjusting plate 84 which bears on a gasket 85. The adjusting plate 84 and the gasket 85 are held in position by the screws 86. The plate 84 has an internal semi-circular surface 90.

An adjusting ring 91 has upper section 92 and lower section 93. The lower section 93 has an external, semi-circular surface 94 which mates with the semi-circular, internal surface 90. The lower section 93 also is internally threaded at 95.

The upper section 92 has external threads 96 which mate with the threads 95, and also has internal threads 97 which mate with external threads 25 of the lock ring 24. The shoulder 98 supports the floor plate assembly.

A flexible gasket 100 engages the exterior surface of the adjusting ring and extends on the plate 84 over the top of the box 82. A protective ring 101 surrounds the gasket. The ring and gasket are held down by the screws 86.

The mating threads 95 and 96 provide for the upper section 92 of the adjusting ring to be moved in a vertical direction so as to adjust the vertical position of the floor plate assembly. The mating, semi-circular surfaces 90 and 94 provide for the ring and assembly to be tilted. It is preferable to lock the ring in a tilted position and for this purpose we have provided the set-screws 102. The vertical and tilting adjustments are accomplished with the floor plate assembly removed. The function of the gasket 100 is to keep concrete away from the semi-circular surfaces 90 and 94 particularly when the ring is being tilted after the pour.

While we have shown the floor plate assembly as being circular it will be understood that the same is readily adaptable in a square or rectangular configuration. In such cases, the receptacle ring 2, the floor plate 10, the gasket 16 and the lock ring 24 are modified as by having a square or rectangular shape. Also, the adjusting ring is provided with threaded apertures (similar to the threaded apertures 60, 62, 63, 64) and hold down screws extend down through the lock ring, the ring gasket, the floor plate and receptacle ring to mate with the threaded apertures and thereby hold the assembly in position. The square or rectangular configuration has the important advantage of providing for a gang of two or more receptacles to be set up side by side. In such instances, it is contemplated that the stop pins on the receptacle caps be omitted so that the caps can swing outboard and thus permit the receptacles to be closer together.

When installing any of the boxes described above a protective cap is employed. This extends over the floor plate assembly and down over the protective ring and protects the same from concrete during the pour. To make an after-set adjustment the protective cap is pried loose, the adjustment is made and then the space between the adjusting ring and the floor concrete is filled with grout.

With respect to the embodiment in FIGS. 10 through 12 it will be observed that the radial space between the protective ring 81 and the adjusting ring 72 will accommodate considerable tilting of the adjusting ring and that the protective gasket 80, being flexible, will also accommodate such tilting adjustment while maintaining its functional capabilities.

Figure 16:
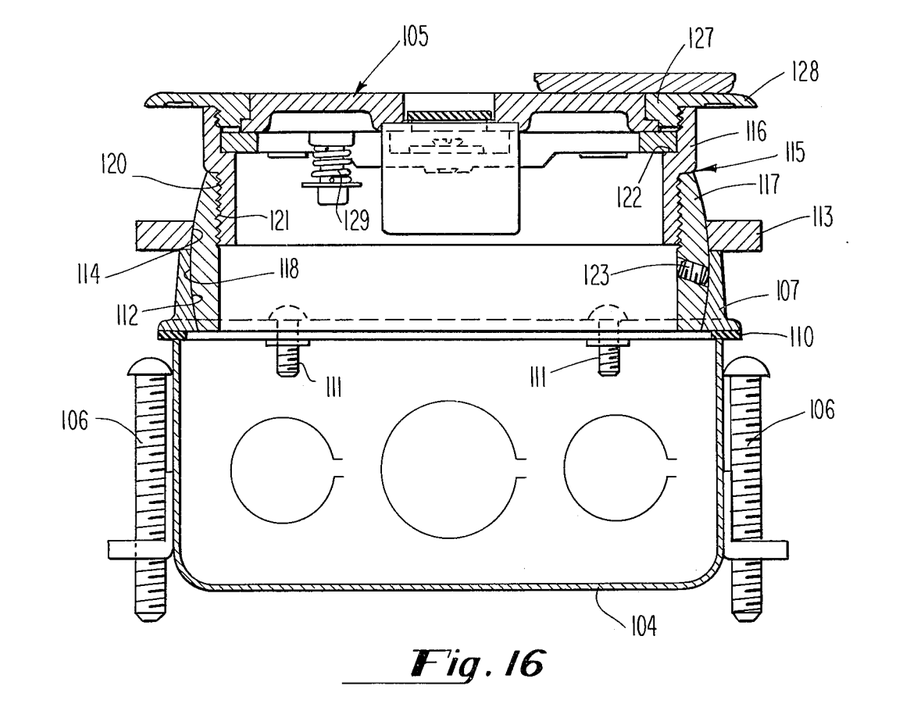
FIG. 16 is an elevational view of a floor box of the kind shown in FIGS. 13–15 without a flexible gasket to protect the semi-spherical adjusting surfaces during the pour.
Figure 17:
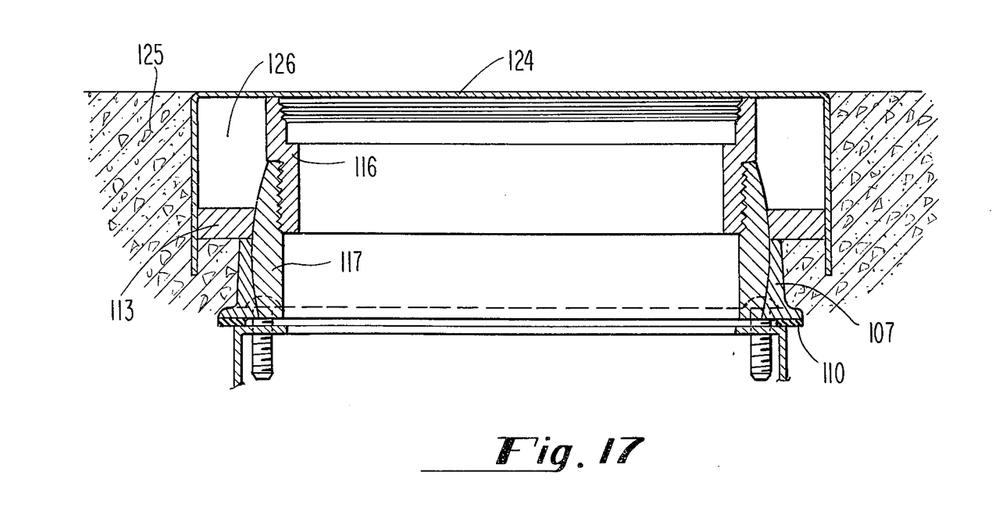
FIG. 17 is an elevational view of the box of FIG. 16 set up with a cap to protect the adjusting surfaces during the pour.

In FIGS. 16 and 17 we have shown a floor box which is a modified version of the vertical-adjust/tilt arrangement of FIGS. 13–15.

The box 104 mounts the floor plate assembly 105 which has the same construction as the assemblies heretofore described but including the modifications noted later. The box has vertical adjusting lugs 106 and the top of the box supports adjusting plate 107 which is on gasket 110. The plate 107 and the gasket 110 are held in position by the screws 111. The plate 107 has an internal semi-circular surface 112. Mounted on top of the adjusting plate 107 is a ring 113 which is secured in place by screws (not shown) threaded in the plate. The ring 113 has an internal semi-circular surface 114.

The adjusting ring 115 has upper section 116 and lower section 117. The lower section 117 has an external semi-circular surface 118 which mates with the internal semi-circular surfaces 112 and 114. The upper section 115 has threads 120 which mate with the threads 121 in the lower section. A shoulder 122 on the adjusting ring supports the floor plate assembly 105.

The threads 120 and 121 provide for the upper section 115 of the adjusting ring to be moved in a vertical direction so as to adjust the vertical position of the floor plate assembly. The mating semi-circular surfaces 112, 114 and 117 provide for the adjusting ring and the floor plate assembly to be tilted in the adjusted vertical position.

The ring and the assembly may be locked in the desired tilted position as by the set screw 123.

As will be noted, the embodiment of FIG. 16 does not utilize a flexible gasket (such as the gasket 100 of FIG. 14) to protect the semi-circular surfaces. However, for protective purposes during the pour we use the arrangement as shown in FIG. 17.

As noted in FIG. 17, the floor plate assembly 105 has been removed and a cap 124 rests on the top of the adjusting ring 115 and extends down over the ring 113. The cap 124 and the ring 107 maintain the concrete 125 away from the semi-circular adjusting surfaces.

After the concrete 125 has hardened the cap 124 is pried off and the top section 116 of the adjusting ring is then moved vertically as required so that the top end of the ring is flush with the top of the concrete. The void space 126 is then filled with grout and the floor plate assembly installed.

The floor plate ring of the floor plate 127 assembly has an outwardly extending flange 128 which is adapted to extend over and engage the grouted area or engage the floor covering if installed. This flange is not shown in the assembly of FIGS. 1–5. Also it is pointed out that the floor plate assembly of FIG. 16 employs compression springs (see spring 129) to pull the swing caps into the sockets rather than the leaf springs 31 of the assembly of FIGS. 1–5.

We claim:

1. A floor plate assembly for use with an electrical underfloor distribution system to provide an electrical power outlet on the surface of the floor, the assembly comprising:

a receptacle ring having means for mounting an electrical receptacle;

a duplex receptacle secured to said receptacle ring;

a substantially flat floor plate mounted on said receptacle ring and formed with a generally flat top surface to be disposed flush with the surface of the floor with which the assembly is used and also formed with a pair of openings respectively providing access to said duplex recptacle, each opening including a lower section open to said receptacle and an enlarged upper section surrounding the lower section and forming a socket for a receptacle cap;

a cap gasket mounted in said sockets;

a pair of receptacle caps respectively disposed in said sockets, the caps being flush with said top surface and respectively covering said receptacles; and a pair of connectors respectively connecting the caps to the floor plate, each connector having means providing for its cap to be moved vertically out of its socket and then rotated over said top surface away from the socket whereby to provide access to the receptacle and said means also providing for the cap to be rotated in the opposite direction and moved downwardly into said socket whereby to cover the receptacle.

2. The floor plate assembly of claim 1 wherein each said connector comprises:

an aperture in the socket, a pin fixed to and extending downwardly from its cap through said aperture and outwardly from the underside of the cap, retaining means on the pin, spring means on the pin, and disposed between the underside of the floor plate and the retainer, the spring means operating to urge the pin and cap in a direction into the socket so that when the cap is in its socket it is firm against the cap gasket.

3. The floor plate assembly of claim 1 further including, for each receptacle cap, a notch formed on the floor plate and a notch formed on the cap, the notches being aligned when the cap is in its socket and the space provided by the aligned notches being for use in receiving a tool for lifting the cap out of the socket and starting rotation of the same over the top surface.

4. The floor plate assembly of claim 3 further including a shoulder formed on the periphery of the floor plate, a floor plate gasket on said shoulder and a floor plate ring mounted on said shoulder firm against the gasket, the ring being externally threaded.

5. The floor plate assembly of claim 3 further including for each cap, a stop pin on the underside of the cap positioned to engage the socket when the cap is rotated and thereby limit the amount of rotation.

6. The floor plate assembly of claim 3 further including a shoulder joined on the outer periphery of the floor plate and a floor plate ring firmly mounted against said shoulder.

7. A floor plate assembly for use with an electrical underfloor distribution system to provide an electrical power outlet on the surface of the floor, the assembly comprising:
 a receptacle ring having means for mounting an electrical receptacle:
 a receptacle mounted on said receptacle ring;
 a substantially flat floor plate mounted on said receptacle ring and having a generally flat top surface to be disposed flush with the surface of the floor with which the assembly is used and also formed with an opening providing access to said receptacle, the opening including a lower section open to the receptacle and enlarged upper section surrounding the lower section and forming a socket for a receptacle cap;
 a gasket mounted in said socket;
 a receptacle cap disposed in said socket, the cap being flush with said top surface and covering said receptacle; and
 a connector connecting the cap to the floor plate, the connector having means for providing for the cap to be moved vertically out of the socket and then rotated over said top surface away from the socket whereby to provide access to the receptacle and also providing for the cap to be rotated in the opposite direction and moved downwardly into said socket whereby to cover the receptacle.

8. In a floor plate assembly for use with an electrical underfloor distribution system to provide an electrical power outlet on the surface of the floor:
 a receptacle;
 a substantially flat floor plate disposed over said receptacle and having a generally flat top surface to be disposed flush with the surface of the floor with which the assembly is used and also formed with an opening providing access to said receptacle;
 a receptacle cap disposed in said opening, the cap being substantially flush with said top surface and covering said receptacle;
 a connector connecting the cap to the floor plate, the connector having means for providing for the cap to be moved vertically out of the opening and then rotated over said top surface away from the opening whereby to provide access to the receptacle and also providing for the cap to be rotated in the opposite direction and moved downwardly into said opening whereby to cover the receptacle, last said means including spring means operating to urge the cap in a direction into the opening.

9. A flush type floor box to be connected to the raceways of an electrical underfloor distribution system and provide an electrical power outlet on the surface of the floor, the box comprising:
 a floor plate assembly including a receptacle, a socket, a cap mounted in the socket covering the receptacle and means providing for the cap to be moved vertically out of the socket and then rotated to uncover the receptacle and then be rotated and moved vertically into the socket whereby to cover the receptacle;
 a box to be connected to the raceways of the underfloor system and providing an enclosed space for connecting conductors to the receptacle;
 a adjusting ring mounting said floor plate assembly; and
 means connected between the ring and the box and providing for the ring and the assembly to be moved in a vertical direction and to be tilted while in a desired vertical position.

10. The floor box of claim 9 further including:
 a flexible gasket gripping the exterior surface of the adjusting ring, the bottom of the gasket extending over and interengaged with the top of the box.

11. A flush type floor box to be connected to the raceways of electrical underfloor distribution system and provide an electrical power outlet on the surface of the floor, the box comprising:
 a floor plate assembly including a receptacle ring, a receptacle mounted on said ring, a floor plate formed with a generally flat top surface and with a pair of openings respectively providing access to said receptacle, each opening including a lower section open to receptacle and an upper section surrounding the lower section and forming a receptacle cap socket, a receptacle cap gasket mounted in said socket, a pair of receptacle caps respectively disposed in said sockets, a shoulder formed on the periphery of the floor plate, and a locking ring disposed on the shoulder and for each cap a connector connecting the cap to the floor plate and having means providing for the cap to be moved vertically out of the socket and rotated over the top surface to provide access to the receptacle;
 a box to be connected to the raceways of an underfloor system and providing an enclosed space for connecting conductors to the receptacle;
 an adjusting ring having an internal support shoulder, the receptacle ring engaging the shoulder whereby to support the assembly on the adjusting ring; and
 means connected between the adjusting ring and the box providing for the adjusting ring and the assembly to be moved in a vertical direction.

12. The floor box of claim 11 wherein said means further includes means for tilting the adjusting ring when in a desired vertical position.

13. The floor box of claim 11 further including: a flexible gasket gripping the exterior surface of the adjusting ring, the bottom of the gasket extending over and inter-engaged with the top of the box.

14. The floor box of claim 11 wherein said locking ring is externally threaded and wherein said means comprises:
 an annular adjusting plate secured to the top of said box and being internally threaded;
 said adjusting ring having internal threads adjacent the top thereof and external threads adjacent the bottom thereof, the external threads engaging the internal threads of said adjusting plate to provide for said vertical adjustment and the internal threads of the adjusting ring engaging the threads of said locking ring and providing for the locking ring to hold the assembly firm against the adjusting ring internal support shoulder.

15. The floor box of claim 12 wherein last said means comprises:
 an annular adjusting plate secured to the top of the box and having means forming a semi-circular surface; and
 means on the adjusting ring forming a semi-circular surface mating with first said surface, the mating surface providing for the adjusting ring and floor plate assembly to be tilted.

16. The floor box of claim 12 wherein said means comprises:
an annular adjusting plate secured to the top of said box;
three threaded apertures in said adjusting plate spaced approximately 120° apart;
three inwardly projecting, slotted bosses formed on said adjusting ring; and
three adjusting screws, each screw having a head and a support shoulder spaced downwardly from the head the screws being respectively threaded in said apertures and the slotted bosses being respectively disposed between the heads and shoulders of the screws, the screws providing for said vertical and tilting motions of the ring.

17. A flush type floor box to be connected to the raceways of an electrical underfloor distribution system and provide an electrical power outlet on the surface of the floor, the box comprising:
a floor plate assembly including a receptacle, a socket, a cap mounted in the socket covering the receptacle and means providing for the cap to be moved vertically out of its socket and then rotated to uncover the receptacle and then be rotated and moved vertically into the socket whereby to cover the receptacle;
a box to be connected to the raceways of an underfloor system and providing an enclosed space for connecting conductors to the receptacle;
an adjusting ring having an upper part and a lower part, the upper part mounting said floor plate assembly;
thread means between the upper and lower parts and providing for the adjusting ring and the floor plate assembly to be moved in a vertical direction; and
means on said lower part forming a semi-circular surface and means on said box forming a semi-circular surface mating with first said surface, the mating surfaces providing for the adjusting ring and floor plate assembly to be tilted.

18. The floor box of claim 17 further including: a flexible gasket engaged with said lower part, the bottom of the gasket extending over and interengaged with the top of the box.

19. The floor box of claim 17 further including means in said lower part for locking the adjusting ring in tilted position.

20. The floor box of claim 17 wherein said means on the box forming a semi-circular surface is an annular adjusting plate comprising a lower part secured to the top of the box and an upper part removeably mounted on the lower part.

* * * * *